(12) United States Patent
Sheehan

(10) Patent No.: US 8,876,439 B2
(45) Date of Patent: Nov. 4, 2014

(54) PARTICULATE HANDLING APPARATUS AND METHOD

(76) Inventor: Patrick Gerrard Sheehan, Bridgend (GB)

( * ) Notice: Subject to any disclaimer, the term of this patent is extended or adjusted under 35 U.S.C. 154(b) by 1341 days.

(21) Appl. No.: 12/303,599

(22) PCT Filed: May 23, 2007

(86) PCT No.: PCT/GB2007/001904
§ 371 (c)(1),
(2), (4) Date: May 27, 2010

(87) PCT Pub. No.: WO2008/003921
PCT Pub. Date: Jan. 10, 2008

(65) Prior Publication Data
US 2010/0232889 A1    Sep. 16, 2010

(30) Foreign Application Priority Data

Jun. 7, 2006 (GB) .................................. 0611283.3

(51) Int. Cl.
*B65G 53/60* (2006.01)
*B01J 8/00* (2006.01)

(52) U.S. Cl.
CPC ................ *B01J 8/0015* (2013.01); *B01J 8/003* (2013.01); *B01J 2208/00778* (2013.01); *B01J 8/0065* (2013.01)
USPC ............. 406/168; 406/83; 406/181; 406/157; 198/534; 198/640

(58) Field of Classification Search
USPC ........... 406/83, 181, 157, 158, 159, 160, 161, 406/162, 163, 168, 169, 170, 174, 175; 198/532, 534, 640; 111/176
See application file for complete search history.

(56) References Cited

U.S. PATENT DOCUMENTS

| | | | | |
|---|---|---|---|---|
| 705,374 | A | * | 7/1902 | Benefield ...................... 406/171 |
| 1,886,295 | A | * | 11/1932 | Morris .......................... 414/787 |
| 2,813,757 | A | * | 11/1957 | Shirk ............................ 406/163 |
| 2,873,147 | A | * | 2/1959 | Payne et al. .................. 406/163 |
| 3,115,370 | A | * | 12/1963 | Cross, Jr. ..................... 406/163 |
| 3,489,464 | A | * | 1/1970 | Delfs ............................. 406/28 |
| 3,884,528 | A | * | 5/1975 | Shaddock .................... 406/115 |
| 4,097,243 | A | * | 6/1978 | Bartholic ...................... 422/140 |
| 4,159,151 | A | * | 6/1979 | Wood ........................... 406/162 |
| 4,216,914 | A | * | 8/1980 | O'Hanlon ..................... 239/666 |
| 4,411,562 | A | * | 10/1983 | Lattmann et al. ............. 406/157 |
| 4,552,573 | A | * | 11/1985 | Weis et al. ...................... 55/312 |
| 4,809,602 | A | * | 3/1989 | Wheeler ......................... 100/35 |
| 4,968,188 | A | * | 11/1990 | Lucassen ........................ 406/70 |
| 5,048,666 | A | * | 9/1991 | Huggins et al. ............... 198/431 |

(Continued)

FOREIGN PATENT DOCUMENTS

| | | |
|---|---|---|
| EP | 0466354 | 1/1992 |
| EP | 1138376 | 10/2001 |
| WO | WO 2007/041254 | 4/2007 |

*Primary Examiner* — Joseph Dillon, Jr.
(74) *Attorney, Agent, or Firm* — Gordon & Jacobson, PC

(57) ABSTRACT

A particulate handling apparatus (1) and method which is suitable for the transfer of kinetic energy from particles of transported particulate material and which lessens the damage suffered by said particulate material by the removal of that kinetic energy. The apparatus includes baffles (9) to reduce the kinetic energy and which are within a shaped vessel into which particulate material is fed through entry port (3) and from which the particulates are removed by exit port (4).

11 Claims, 3 Drawing Sheets

(56) References Cited

U.S. PATENT DOCUMENTS

| | | | |
|---|---|---|---|
| 5,226,213 A * | 7/1993 | Lewis et al. | 19/66 R |
| 5,522,328 A * | 6/1996 | Long | 111/176 |
| 5,769,572 A * | 6/1998 | Pfeiffer | 406/153 |
| 5,785,464 A * | 7/1998 | May et al. | 406/163 |
| 5,911,667 A * | 6/1999 | Sanchis et al. | 53/531 |
| 6,039,513 A * | 3/2000 | Law | 406/171 |
| 6,068,429 A * | 5/2000 | Schultheis | 406/172 |
| 6,089,378 A * | 7/2000 | Mascheretti et al. | 209/143 |
| 6,467,513 B1 | 10/2002 | Yanaru et al. | |
| 6,564,528 B1 * | 5/2003 | Keegan | 53/171 |
| 6,634,485 B1 * | 10/2003 | Cailbault | 198/417 |
| 6,805,232 B1 * | 10/2004 | Isom | 198/534 |
| 7,066,689 B2 * | 6/2006 | Maguire | 406/18 |
| 7,854,205 B2 * | 12/2010 | Beaujot | 111/176 |
| 8,752,490 B2 * | 6/2014 | Beaujot | 111/178 |
| 2002/0168253 A1 * | 11/2002 | Musser | 414/293 |
| 2004/0244658 A1 * | 12/2004 | Conrad et al. | 111/170 |
| 2010/0107945 A1 * | 5/2010 | Beaujot | 111/176 |
| 2011/0024265 A1 * | 2/2011 | Kleynen | 198/534 |
| 2012/0031315 A1 * | 2/2012 | Beaujot | 111/174 |

* cited by examiner

PARTICULATE HANDLING APPARATUS AND METHOD

BACKGROUND OF THE INVENTION

1. Field of the Invention

This invention relates to an improved particulate handling apparatus and a method of using that apparatus. The invention relates especially but not exclusively to apparatus suitable for handling particulates, which have been imparted with a high kinetic energy due handling procedures.

2. State of the Art

Particulates, which from hereon are referred to a "pellets", (which is a term used to describe particulates in general) are often conveyed pneumatically using a gas to entrain the solids. Such pneumatic conveyance systems are used to transfer pellets between containers, for example from chemical reactors to drums or vice versa. When the pellets are a catalyst the transfer of pellets may be in order to load a reactor vessel, or unload a reactor vessel to allow treatment of the catalyst or re-bedding of the catalyst.

Known methods of for example loading catalyst beds involve lifting bulk containers containing pellets and loading a catalyst bed by allowing the pellets to flow into the catalyst bed by means of a flexible sock. Such systems have the disadvantage of having to use a crane to lift material before it can be transferred. Consequently, pneumatic systems for transfer of material have been developed, which avoid the need for craning.

Pneumatic systems involve vacuuming catalyst pellets from ground level to an interceptor or separator above the catalyst bed but again such systems use the free fall of the catalyst pellets through a flexible sock to load the catalyst bed. Further, a primary objective for a pneumatic conveying system is to convey the pellets at the highest possible rate to maximize transfer, which saves time and therefore reduces the cost of handling material. To do this, the entrained pellet gas mixture is forced through piping, conduits or ducting at the highest possible velocity. A problem, however, with such an approach is that the higher the velocity of transportation of the pellets, the greater the kinetic energy each pellet acquires. When the pellet and entrainment gas mixture reaches the location where the pellets are to be discharged, for instance into a drum or a reactor, the entrainment gas is separated from the pellets and the pellets moved to their desired position.

Once the entrainment gas has been separated from the pellets, the kinetic energy possessed by the pellets needs to be reduced and transferred from the pellets. In previously known particulate handling apparatus, and in particular, catalyst pellet handling apparatus, this transfer has been via friction with a gas whilst the pellet is in motion through said gas within a loading hopper and/or by impacting a surface of the loading hopper. This method of transfer of kinetic energy from the pellets is only suitable for pellets where the impact force experienced by the pellets is not sufficiently great to physically damage the pellets. It has been found that large pellets, for example 3-16 mm in their greatest dimension, or particularly dense pellets gain sufficient kinetic energy during transportation that the current methods of reducing the kinetic energy in the pellets is insufficient. This has the result that when the pellets impact a surface of the loading hopper, cracking or fragmentation of the pellets occurs. This is clearly undesirable as it greatly shortens the life of the pellets and where the pellets are catalysts, lessens the efficiency of the catalyst when it is working.

Another known method of reducing the kinetic energy associated with pellets is to use a baffle in a piping that is used to separate the pellets prior to the pellets being transferred to a hopper to feed a catalyst reactor vessel. However, this has the disadvantage that because the separator is upstream of the hopper, there may be loss of some of the lighter particulate material before it reaches the hopper. This has the disadvantage that as a result of loss of material the processing of the material is less cost effective. Also, having a separation means and baffles, which are separate from the hopper means that the whole system is more cumbersome and less portable. Further, when baffling of the material occurs before the material enters a hopper, there is a need to ensure that any particulate material that is lost is captured or vented from the operation site to avoid environmental contamination.

SUMMARY OF THE INVENTION

The current invention provides a particulate handling apparatus and method, whereby the kinetic energy is transferred from the particles being transported in a safe and efficient manner. Further, the system of the current invention is compact and easy to use.

According to the present invention there is provided a particulate handling apparatus for the transfer of kinetic energy from particles of particulate material being transported through the system, wherein the system comprises a vessel having an entry port for receiving the particulate material and an exit port through which particulate material can be released from the vessel, the vessel having one or more baffle members extending from at least one wall of the vessel into a chamber in the vessel, said one or more baffle members providing a surface against which at least a portion of the particulate material passing through the system impacts without impacting against a wall of the vessel protected by the one or more baffles, said one or more baffles acting to lessen the risk of damage suffered by said particulate material by impacting with the wall of the vessel.

Preferably, the particulate handling apparatus includes a separation arrangement for separating conveyed particulate from a conveying gas.

In a preferred arrangement, the separation arrangement is formed as part of the vessel of the particulate handling apparatus, with the entry port being connected to a gas delivery arrangement to deliver a conveying gas to the vessel which carries particulate material to the chamber of the vessel, and towards the one or more baffles positioned on a wall of the vessel such that particulate material being conveyed into the vessel impacts on the one or more baffle, prior to the particulate material falling towards the exit port, the vessel also having a gas outlet port providing an exit through which conveying gas may be exhausted.

Preferably, the chamber of the vessel comprises a side wall having a curved surface with the one or more baffles being positioned on the wall of the vessel at a location before the curved surface begins.

It is envisaged that the location, where the one or more baffles are attached to the wall of the vessel, is provided by a support wall that extend from the wall of the vessel and which provides a substantially horizontal surface from which the one or more baffle members depend into the vessel.

The chamber of the vessel is preferably of greater cross sectional volume than the entry port and, thus after entry via the entry port the conveying gas slows down. The slowing down of the conveying gas has the result that heavier particles are caused to drop from the gas flow and these particles are caused, because of inertia, to travel towards the exit port.

In a particularly preferred embodiment of the present invention the conveying gas is induced to exhaust from the chamber via the gas outlet port by way of a pressure reducing means causing the gas outlet port to be at reduced pressure relative to the chamber. This pressure differential causes the conveying gas to exit the chamber more efficiently.

It is most preferred that the baffles are made from a flexible material that is so configured that each baffle is capable of absorbing energy when impacted by a pellet, but which does not absorb all of the kinetic energy of the pellet. Such materials may be of any flexible material including soft plastics, or most preferably, of natural or artificial rubber.

In a particularly preferred embodiment of the present invention each baffle is comprised of a strip of sheet rubber. One end of each strip of sheet rubber is attached to a wall of the chamber and the other end of each strip of sheet rubber being free to hang down into the chamber/body of the vessel. The thickness of the sheet rubber employed and the number of strips that comprise the baffle are dependent upon the expected kinetic energy of the particulate material. The desired thickness and number of strips may either be determined empirically or theoretically.

It is envisaged that the baffles comprise a plurality of spaced strips hanging down from the wall of the vessel, which provides a support for the baffles.

It is preferred that the one or more baffles can be detachably secured to the wall of the vessel to allow for damaged baffles to be replaced if needs be.

Preferably, the wall of the vessel or the baffles themselves, have attachment members that allow for rapid attachment and detachment to a wall of the vessel. The detachment and attachment this allows empirical determination of the optimal number of strips and optimal thickness of each strip.

It is envisaged that the attachment members include standard fixing means such as screw fixings or resilient push fit fixings or devices that interact with slots through the wall of the second chamber.

In a preferred arrangement, the baffle nearest the entry port is of a shorter length than the baffle furthest from the entry port. By having a series of baffles having an increasing length away from the entry port to the vessel the incoming particles are caused to form a trajectory as they impact on the baffles which causes the particles to fall towards the exit port of the particulate handling system.

In a preferred arrangement, there is provides a kinetic energy reduction member for use with a particulate handling apparatus or separation arrangement as previously described, the kinetic energy reduction means comprises one or more baffle members which are securable to the side of a vessel forming said particulate handling system or separation arrangement.

It is envisaged that the entry port of the vessel may be connected to a feed chamber to feed particulate material to the vessel.

It is envisaged that with such an arrangement the feed chamber is formed from a portion of pipe or ducting with having strips attached either to an internal wall of said pipe or ducting or being inserted into said pipe or ducting via slots through said wall. These strips may be used to control the passage of material into the vessel.

Preferably, the wall may be provided with a large number of slots, which can either be used to anchor a strip of kinetic energy absorbing material or may be blanked off when not in use.

It is preferred that the particulate handling apparatus further includes a loading hopper to feed material to the entry port of the vessel.

In yet another arrangement, the exit port is connected to a release member to feed particulate material to a reactor.

It is envisaged that the exit port may have a closure member to close the vessel when the particulate handling apparatus is not in use to avoid the risk of contamination or tampering.

As can be seen the particulate handling apparatus of the present invention is designed and configured to try to minimise the force of impacts experienced by particulate material entering the vessel and thus impacting on its walls. As well as using baffles, this is at least partially achieved by causing the entry angle of the particulate material into the hopper to be such that when the particulate material first impacts a wall of the hopper it does so at an acute angle to the surface of the hopper. The particulate material is thus not subjected to a sudden deceleration, rather it is subject to one or more small decelerations. Furthermore, the force of the impact may be lessened by making the inner surface of the hopper out of an energy absorbing material, such as a soft plastic, or an artificial or natural rubber. The surface may be smooth or may be contoured to alter the energy absorbance characteristics of the surface.

In a particularly preferred embodiment of the present invention the vessel is of a shape having one side of the vessel being curved with the side of the vessel facing the curved side being a substantially straight and angles wall. The vessel has an internal shape that is an irregular conical shape with the cone narrowing towards the bottom of the hopper when in use. The hopper is provided with an outlet port, which is substantially at the apex of the cone.

It is envisaged that the closed end of the vessel may be provided with a vision panel. The vessel or hopper is further provided with a mounting flange adapted to engage with a manway on a reactor vessel or a drum for conveying the particulate material.

The present invention is also concerned with a method of transferring kinetic energy from particulate material. The method typically includes permitting particulate material to pass through the apparatus according to the first aspect of the present invention.

The present invention will be further described and explained by way of example only and with reference to the accompanying drawings.

DETAILED DESCRIPTION OF THE PREFERRED EMBODIMENTS

Figure 1:
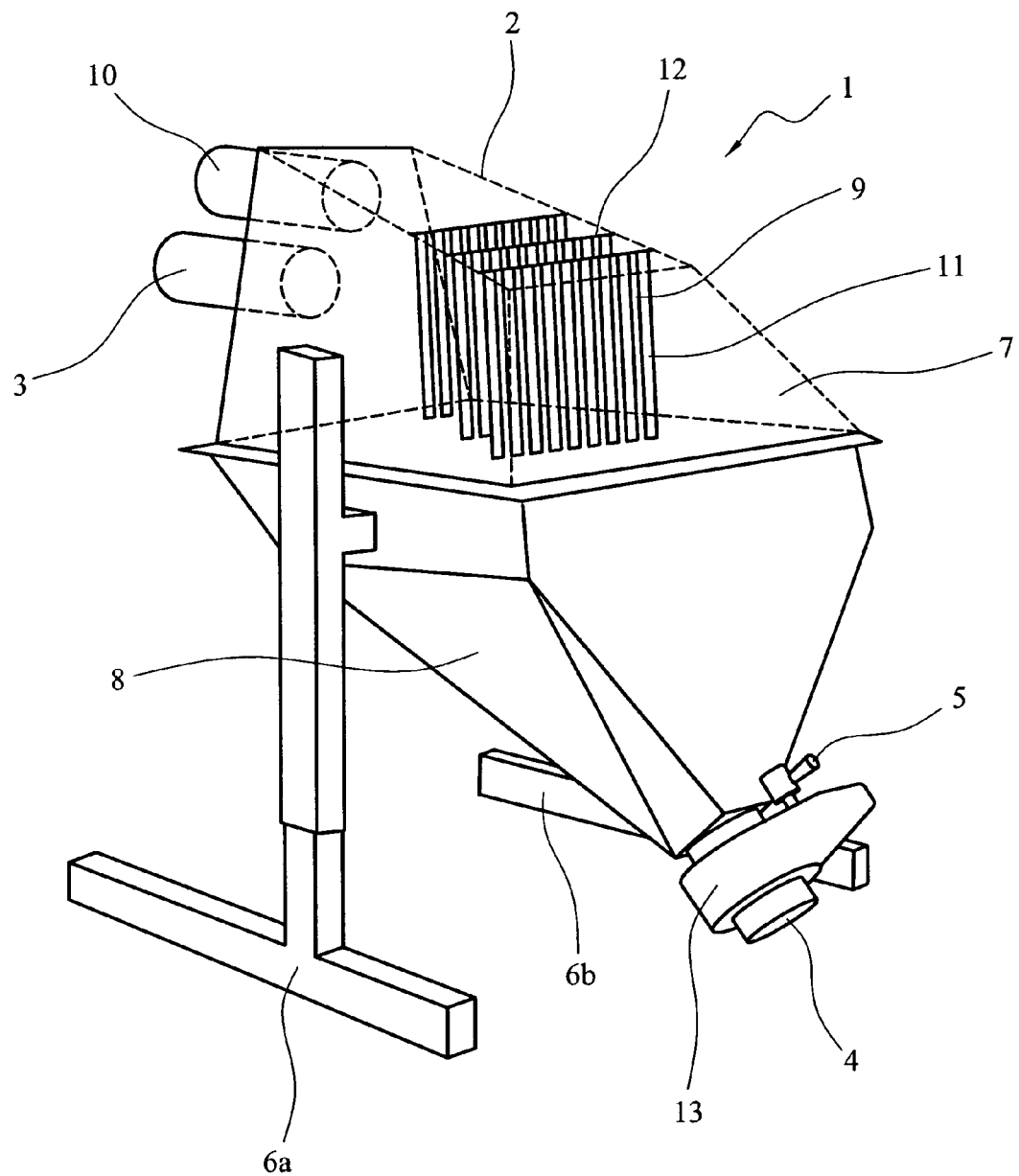
FIG. 1 shows a particulate handling apparatus according to an embodiment of the invention.

With reference to the Figures, the apparatus of the illustrated embodiment of the present invention is generally shown as 1 in FIG. 1. The apparatus comprises a vessel 2 having an entry port 3 so that particulate material may be delivered to the vessel, preferably by way of a gas stream. At the other end of the vessel, there is an exit port 4. The exit port is positioned below the entry port 3, so that particulate material can fall towards the exit port. The exit port has a control valve 5 for controlling the flow of material from the vessel. The vessel is supported be legs 6a and 6b on either side of the vessel. The height of the legs can be adjusted for ease of use. Also, rather than being supported by two separate legs, more legs can be used or even one pedestal type support could be used. The legs may be detachable for ease of transport or storage.

The vessel is substantially of an irregular 7 being of a convex curve, while lower wall 8, which is opposite and facing wall 7 is straight but angles towards the exit port 4. This provides the vessel with a chamber having wider dimensions near the entry port 3 than the exit port end 4. Situated on the convex wall 7 is a series of baffles 9 formed of several series of parallel strips of material depending down from the wall of the vessel 7 before it starts to curve. As shown, there are three parallel strips of baffles comprising eight strips but any combination of strips may be used. Below the entry port 3 is a gas exit port 10.

In use, pellets of for example a diameter between 3 and 16 mm that enter the apparatus illustrated at high velocities, and as such with high kinetic energies.

The pellets enter the vessel through the entry port 3 and impact on baffles strips 9. The impact with the baffle strip reduces the kinetic energy of the pellets and prevents them from impacting on the wall 7. Because of the impact on the strips, lighter pellets will be caused to change their trajectory and will be caused to fall in an arc towards the exit port 4, which is below the baffles and to one side of the baffles. Not only will the lighter particles or pellets be redirected but also heavier particles will impact the baffles and again be caused to fall towards the outlet port 4. As can be seen, the baffle means 9 comprises a number of rubber strips 11 suspended from the top of the chamber of the vessel at location 12. The rubber strips are arranged in three rows placed across the direction of flow of the pellets and a pellet would impact the rows of strips one after another.

The upper surface 7 of the vessel may be provided with an inspection window (not shown), which is preferably a glass inspection window. The lower "conical" portion of the vessel that is provided with the exit port or orifice 4 has a flange 13. The flange 13 is fitted with an airtight seal and is adapted to be flanged to a top manway flange of a reactor vessel. Exit port 4 allows pellets entering into the hopper to exit the hopper and be delivered to their final desired position in the reactor vessel via known means such as a loading sock.

Figure 4:
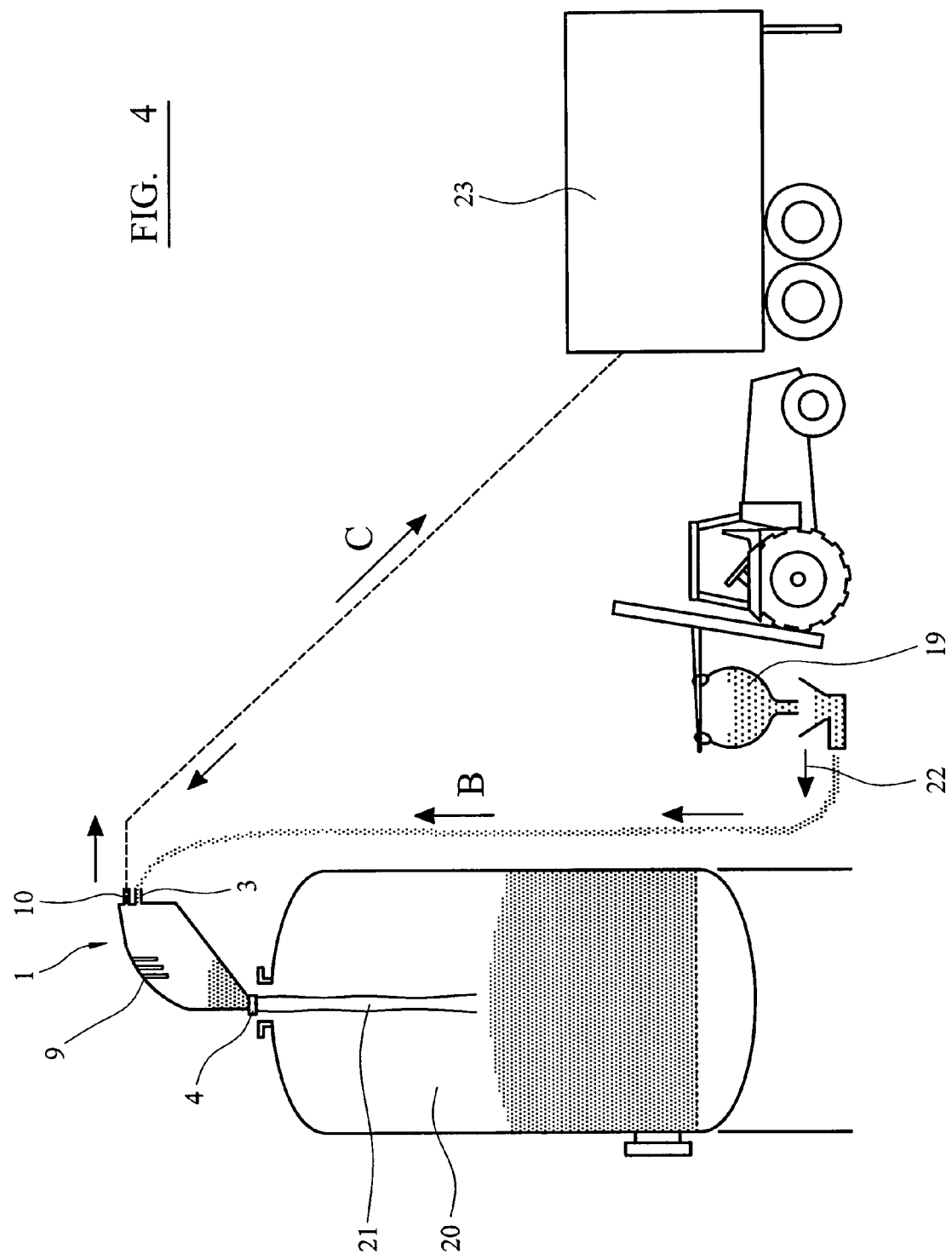
FIG. 4 shows, particulate handling apparatus as shown in FIG. 1, attached to a reactor.

The particulate material has been caused to pass through the vessel by way of a gas. Once the particulate material has been delivered to the vessel so that the material is being directed to the exit port, the gas is re-circulated and vented from the vessel by way of gas outlet port 10. The re-circulating may be by way of a fan system or a directed blower system or even a vacuum (such as from vacuum 23 as shown in FIG. 4) may be applied to reduce air pressure at the outlet and to suck any air out of the vessel.

Figure 2:
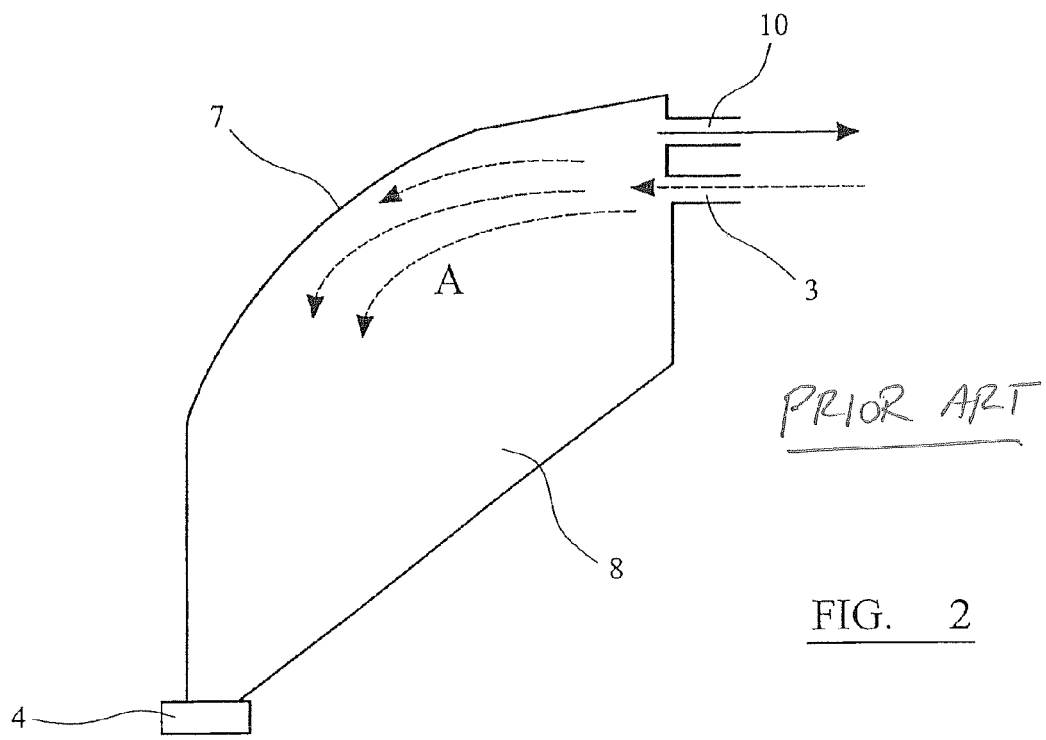
FIG. 2 shows the flow path of particulate material through the vessel of FIG. 1, without the baffles.

FIG. 2 shows the trajectory of pellets if no baffles are present. The pellets are fed to the vessel by way of entry port 3. The gas carrying the pellets flows in the direction of arrow A. The pellets impact on the curved wall 7 of the vessel. This impact although reducing kinetic energy can damage the pellets. The gas outlet port 10, is located above and adjacent the inlet 3 and the separating action in the vessel causes the exhaust pneumatic carrier gas to be vented in a direction opposite to that which it enters the separation means. This has the effect of minimising the amount of particulate material exiting the separation means via outlet 10. Pellets that are separated from the gas flow are caused to fall towards the exit port 4 located below the wall 7.

Figure 3:
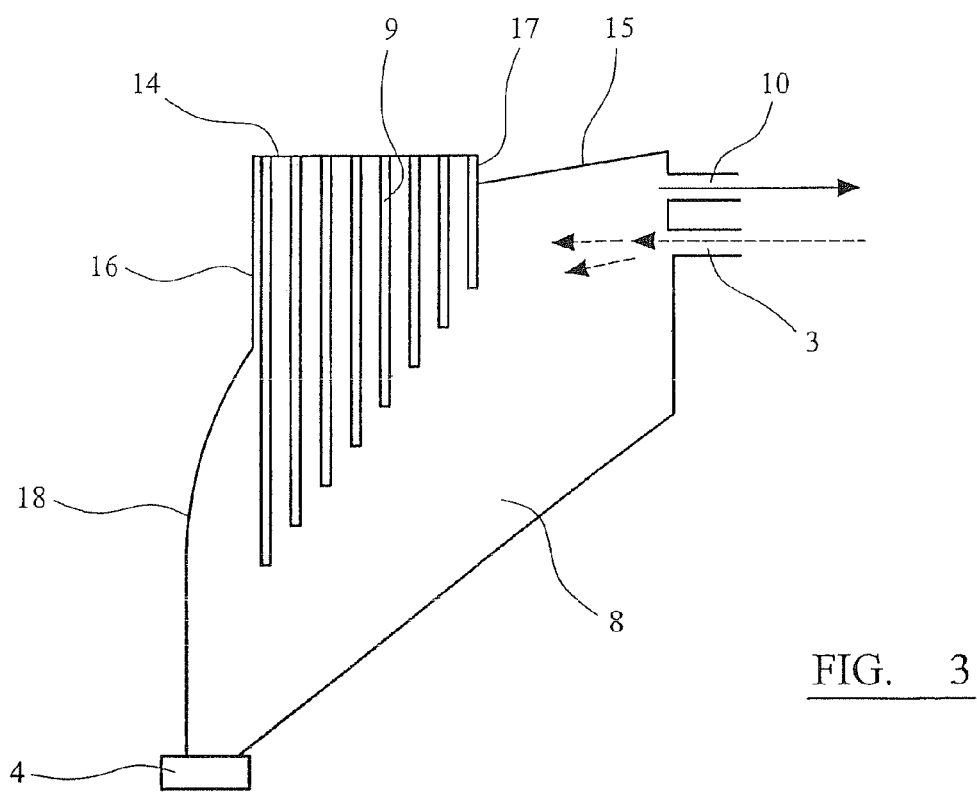
FIG. 3 shows the flow path of particulate material through apparatus as shown in FIG. 1, with baffles being present.

FIG. 3 shows the same arrangement as shown in FIG. 2 but baffles 9 are present. The baffles are positioned in the trajectory of travel of particles between the inlet port and the exit port. Lighter particles will as a result of aerosol turbulence, move upwards, towards the inner surface of the vessel while heavier particles will fall towards the exit port 4. Intermediate size particles will impact on the baffles rather than on the walls of the vessel.

As can be seen, particulate material is fed to the vessel by entry port 3. The particles/pellets disperse because the vessel is of less constrained dimensions than the entry port 3. The particles and in particular lighter particles flow along a gently sloped wall 15 of the upper part of the vessel towards the baffles 9, which comprise eight rows of strips handing down from a substantially flat wall 14. This wall is formed of a box fitted to the upper wall of the vessel before it forms a convex surface 18. The box has twp walls 16, 17, which extend from the upper wall of the vessel. Wall 17, which extends from the gently sloping wall 15, is shorter than wall 16, which extends from curved wall 18. The baffles hang down into the chamber of the vessel and are offset to one side of the exit port 4, so that particles that hit the baffles are caused to fall down towards sloped wall 8, which slopes towards the exit port 4. The particles can collect in the region of the exit port so that they can then be released from the vessel when needed.

FIG. 4 shows the device of the invention when used commercially. Pellets are delivered to a site and released from containers such as bags 19 into a feed hopper 22. Pellets are drawn along pathway B to the inlet 3 of the vessel and into the vessel 1. The pellets pass through the vessel, impacting on the baffles 9 is of a certain speed and trajectory. The pellets then pass through outlet into feed sock 21 and to reactor 20. Gas/air is vented out of gas outlet 10 along path C to vacuum 23.

The vessel/hopper 1 is sealingly secured to the upper manway of the reactor vessel 20 via a flange. The reactor vessel 20 is completely sealed off from any process gas by blinding or turning off any inlet or outlet process valves to the reactor. In this way, both the reactor and the catalyst handling system of the present invention are sealed off from external atmosphere, thus allowing both the apparatus and the reactor to be placed under negative pressure. By this means, the need for an airlock at the base of the vessel/hopper is eliminated. This allows continuous loading of the catalyst bed in the reactor and reduces the build-up of catalyst pellets in the vessel/hopper.

A stream of pellets of diameter between 3 and 16 mm and of higher or lower densities as desired is delivered entrained in a high velocity stream of pneumatic carrier gas through ducting. As the pneumatic carrier gas enters the larger volume of vessel it drops the pellets suspended in it, and is induced to flow out of the separation means via gas outlet 10 by means such as a vacuum pump. The impact of the pellets on the baffle means will cause the baffle means to deform or flex and absorb energy from the pellets.

An operator may view the pellets entering the vessel/hopper via the viewing window and cause fine adjustment to the kinetic energy of the pellets as they enter the hopper. If the amount of strips in the baffle means 9 remains constant, experience will allow an operator to calibrate the disposition of the gas flow or angle or number of strips forming the baffle to alter kinetic energy absorption.

The invention as described has the advantages that it is compact and also due to the flow of material through the device, it can avoid the need to clamp it to apparatus such as the reactor vessel 20 because of the use of a vacuum throughout the system.

Although individual embodiments of the invention have been described, the invention is intended to cover any combination of the embodiments discussed. Further it will be clear to a person skilled in the art that the invention can cover equivalent arrangements to those described and which fall within the scope of the invention as claimed.

The invention claimed is:

1. A particulate handling apparatus for the transfer of kinetic energy from particles of particulate material being transported through a particulate handling system, the particulate handling apparatus comprising:
   a vessel having a hopper configuration including an upper portion with an entry port for receiving the particulate material, and a lower portion which tapers toward an exit port through which particulate material can be released from the vessel; and
   the vessel further including a plurality of elongate flexible baffle members each secured at one end to and suspended from an upper wall of the vessel with the opposing end freely hanging into the vessel, the plurality of flexible baffle members arranged such that particulate material entering the vessel through the entry port impacts against the plurality of flexible baffle members, the plurality of flexible baffle members made from an elastomeric polymer material and configured to absorb kinetic energy of particulate material that impacts thereon by deformation or flexing of the flexible baffle members, and the plurality of flexible baffle members being further arranged above the exit port such that the particulate material is caused to fall towards the exit port following impact with the plurality of flexible baffle members.

2. A particulate handling apparatus according to claim 1, wherein:
   the entry port is connected to a gas delivery arrangement for delivery of conveying gas carrying particulate material to the vessel; and
   the vessel further includes a gas outlet port that provides an exit through which the conveying gas may be exhausted.

3. A particulate handling apparatus according to claim 2, wherein:
   the conveying gas is induced to exhaust from the vessel via the gas outlet port by way of a pressure reducing means causing the gas outlet port to be at reduced pressure relative to the vessel.

4. A particulate handling apparatus according to claim 1, wherein:
   the vessel further comprises a side wall having a curved surface with the plurality of flexible baffle members being positioned at a location offset from the curved surface.

5. A particulate handling apparatus according to claim 1, wherein:
   the elastomeric polymer material comprises a natural or artificial rubber.

6. A particulate handling apparatus according to claim 1, wherein:
   the plurality of flexible baffle members each comprise a strip of sheet rubber.

7. A particulate handling apparatus according to claim 1, wherein:
   the flexible baffle member nearest the entry port is of a shorter length than the flexible baffle member furthest from the entry port.

8. A particulate handling apparatus according to claim 1, wherein:
   the exit port is connected to a release member to feed particulate material to a reactor; and
   the exit port includes a closure member to close the vessel when the particulate handling apparatus is not in use to avoid the risk of contamination and/or tampering.

9. A particulate handling apparatus according to claim 1, wherein:
   the vessel further includes a first wall opposite to the entry port, wherein the first wall has a convex shape to cause any particulate material impacting on the first wall to be directed towards the exit port of the vessel; and
   the vessel further includes a second wall opposite the first wall, wherein the second wall is substantially straight and angled towards the exit port thereby providing the vessel with an irregular conical shape which narrows towards exit port of the vessel.

10. A particulate handling apparatus according to claim 1, wherein:
    the entry port is configured to direct the particulate matter into the vessel at a characteristic inflow direction; and
    the plurality of flexible baffle members are spaced apart from one another along the characteristic inflow direction of the particulate matter.

11. A particulate handling apparatus according to claim 10, wherein:
    the flexible baffle member nearest the entry port is of a shorter length than the flexible baffle member furthest from the entry port.

* * * * *